United States Patent
Daly

(10) Patent No.: US 7,136,633 B2
(45) Date of Patent: *Nov. 14, 2006

(54) METHOD AND APPARATUS FOR OVER-THE-AIR PROGRAMMING OF TELECOMMUNICATION SERVICES

(75) Inventor: Brian Daly, Redmond, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 354 days.

This patent is subject to a terminal disclaimer.

(21) Appl. No.: 10/214,315

(22) Filed: Aug. 8, 2002

(65) Prior Publication Data

US 2002/0193103 A1    Dec. 19, 2002

Related U.S. Application Data

(63) Continuation of application No. 09/213,416, filed on Dec. 17, 1998, now Pat. No. 6,456,843, which is a continuation of application No. 08/728,275, filed on Oct. 8, 1996, now Pat. No. 6,122,503.

(51) Int. Cl.
*H04M 3/00* (2006.01)
*H04Q 7/20* (2006.01)

(52) U.S. Cl. .................. 455/418; 455/419; 455/432.1; 455/433; 455/435.1; 455/466

(58) Field of Classification Search ............... 455/418, 455/419, 420, 432.1, 433, 435.1, 435.2, 435.3, 455/414.1, 466, 560, 456.5, 461, 561
See application file for complete search history.

(56) References Cited

U.S. PATENT DOCUMENTS

| | | | |
|---|---|---|---|
| 4,788,543 A | 11/1988 | Rubin | |
| 4,901,340 A * | 2/1990 | Parker et al. | 455/432.3 |
| 4,903,320 A | 2/1990 | Hanawa | |
| 4,916,728 A | 4/1990 | Blair | |
| 5,020,091 A | 5/1991 | Krolopp et al. | |
| 5,101,500 A | 3/1992 | Marui | |
| 5,109,403 A * | 4/1992 | Sutphin | 455/419 |
| 5,159,625 A | 10/1992 | Zicker | |
| 5,203,015 A | 4/1993 | George | |
| 5,276,905 A | 1/1994 | Hurst et al. | |
| 5,404,355 A | 4/1995 | Raith | |
| 5,406,643 A | 4/1995 | Burke et al. | |
| 5,412,375 A | 5/1995 | Wood | |
| 5,420,908 A | 5/1995 | Hodges et al. | |
| 5,442,806 A | 8/1995 | Barber et al. | |
| 5,463,675 A | 10/1995 | Gerszberg | |
| 5,479,484 A | 12/1995 | Mukerjee et al. | |
| 5,483,684 A | 1/1996 | Ono et al. | |
| 5,504,803 A | 4/1996 | Yamada et al. | |
| 5,509,052 A | 4/1996 | Chia et al. | |
| 5,513,242 A | 4/1996 | Mukerjee et al. | |
| 5,513,247 A | 4/1996 | Mukerjee et al. | |
| 5,517,677 A | 5/1996 | Moon | |
| 5,524,135 A | 6/1996 | Mizikovsky et al. | |

(Continued)

FOREIGN PATENT DOCUMENTS

CA        2115877        11/1994

(Continued)

*Primary Examiner*—Duc M. Nguyen
(74) *Attorney, Agent, or Firm*—Woodcock Washburn LLP

(57) ABSTRACT

A method for updating service information stored in a mobile station relies on the programmability of the station and over-the-air transmission of teleservice information. When a station is inactive, a delivery flag is set when the station subsequently registers the over-the-air transmission is performed.

31 Claims, 6 Drawing Sheets

U.S. PATENT DOCUMENTS

| | | |
|---|---|---|
| 5,541,977 A | 7/1996 | Hodges et al. |
| 5,586,338 A | 12/1996 | Lynch et al. |
| 5,590,397 A | 12/1996 | Kojima |
| 5,603,084 A | 2/1997 | Henry, Jr. et al. |
| 5,613,204 A | 3/1997 | Haberman et al. |
| 5,613,208 A | 3/1997 | Blackman et al. |
| 5,655,218 A | 8/1997 | Smolinske |
| 5,711,001 A | 1/1998 | Bussan et al. |
| 5,734,980 A | 3/1998 | Hooper et al. |
| 5,754,542 A | 5/1998 | Ault et al. |
| 5,754,952 A | 5/1998 | Hodges et al. |
| 5,761,618 A | 6/1998 | Lynch et al. |
| 5,768,380 A | 6/1998 | Rosauer et al. |
| 5,790,952 A | 8/1998 | Seazholtz et al. |
| 5,802,460 A | 9/1998 | Parvulescu et al. |
| 5,832,367 A | 11/1998 | Bamburak et al. |
| 5,845,198 A | 12/1998 | Bamburak et al. |
| 5,887,254 A | 3/1999 | Halonen |
| 5,896,566 A | 4/1999 | Averbuch et al. |
| 5,905,955 A | 5/1999 | Bamburak et al. |
| 6,044,265 A * | 3/2000 | Roach, Jr. .................. 455/419 |
| 6,047,071 A * | 4/2000 | Shah .......................... 380/273 |
| 6,122,503 A * | 9/2000 | Daly .......................... 455/419 |
| 6,381,454 B1* | 4/2002 | Tiedemann et al. ......... 455/419 |
| 6,456,843 B1* | 9/2002 | Daly .......................... 455/419 |

FOREIGN PATENT DOCUMENTS

| | | |
|---|---|---|
| EP | 0 459 344 A1 | 12/1991 |
| EP | 0 510 322 A2 | 10/1992 |
| GB | 2257334 A | 1/1993 |
| WO | WO 96/39787 | 12/1996 |
| WO | WO 97/16938 | 5/1997 |

* cited by examiner

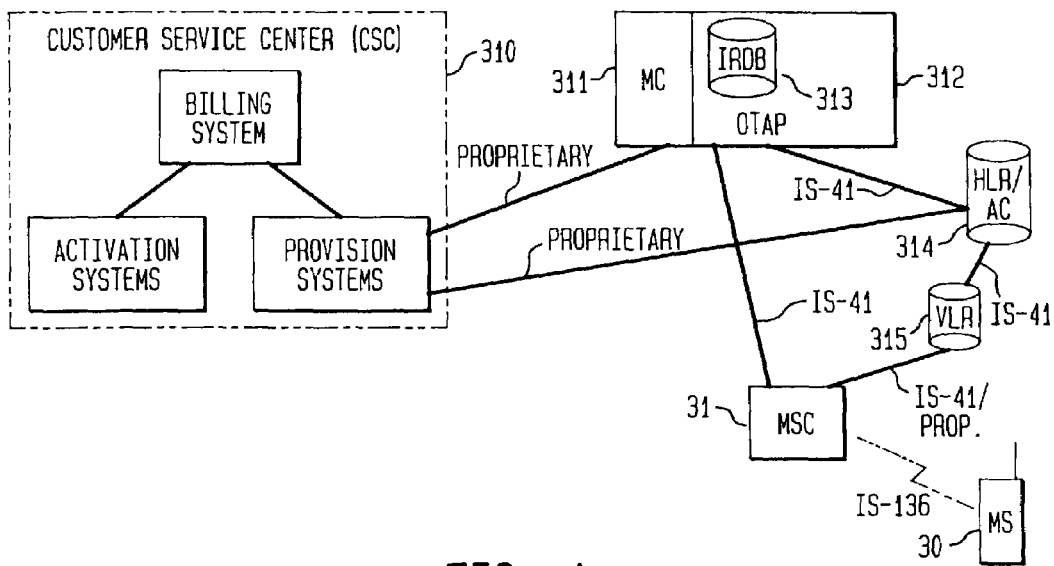

| DATA | LENGTH (BYTES) |
|---|---|
| IR CONTROL DATA | 1 |
| BAND ORDER | 8 * 0.5 |
| NUMBER OF PARTNER SOCs | 1 |
| PARTNER SOC LIST | No_Partner_SOCs * 2 |
| NUMBER OF PARTNER SIDs | 1 |
| PARTNER SID LIST | No_Partner_SIDs * 2 |
| NUMBER OF FAVORED SOCs | 1 |
| FAVORED SOC LIST | No_Favored_SOCs * 2 |
| NUMBER OF FAVORED SIDs | 1 |
| FAVORED SID LIST | No_Favored_SIDs * 2 |
| NUMBER OF FORBIDDEN SOCs | 1 |
| FORBIDDEN SOC LIST | No_Forbidden_SOCs * 2 |
| NUMBER OF FORBIDDEN SIDs | 1 |
| FORBIDDEN SID LIST | No_Forbidden_SIDs * 2 |
| NUMBER CELLULAR (NO_CELLULAR) | 2 |
| NUMBER PCS (NO_PCS) | 2 |
| RESCAN COUNT (RESCAN_COUNT) | 2 |
| RESCAN LOOP (RESCAN_LOOP) | 2 |

FIG. 5

| FIELD | TYPE |
|---|---|
| IDENTIFIER | M |
| LENGTH | M |
| SMS_BearerData | M |
| SMS_TeleserviceIdentifier | M |
| ELECTRONIC SERIAL NUMBER | O |
| MOBILE IDENTIFICATION NUMBER | O |
| SMS_NotificationIndicator | O |
| SMS_OriginalOriginatingAddress | O |

FIG. 6

| FIELD | TYPE |
|---|---|
| IDENTIFIER | M |
| LENGTH (N), OCTETS | M |
| CONTENTS | M |

FIG. 7

| H | G | F | E | D | C | B | A | OCTET |
|---|---|---|---|---|---|---|---|---|
| SMS BEARER DATA (OPTS MESSAGE) | | | | | | | | 1 |
| | | | | | | | | 2 |
| | | | | | | | | ... |
| | | | | | | | | N |

FIG. 8
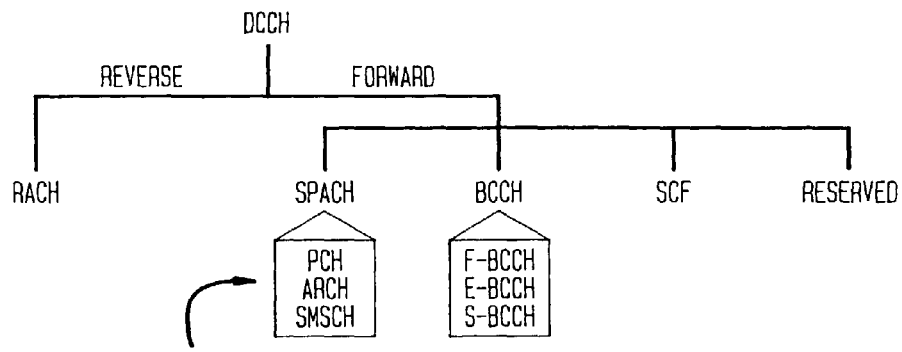
SMS POINT-TO-POINT, PAGING AND ACCESS RESPONSE CHANNEL (SPACH) IS A LOGICAL CHANNEL USED TO BROADCAST INFORMATION TO SPECIFIC PHONES REGARDING SMS POINT-TO-POINT (SMSCH), PAGING (PCH), AND TO PROVIDE AN ACCESS RESPONSE CHANNEL
FIG. 9
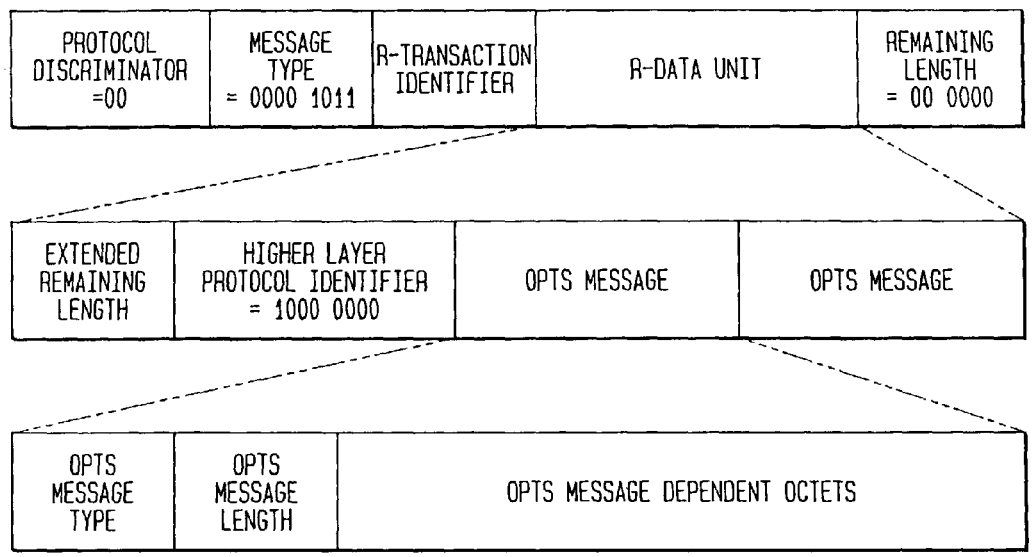
FIG. 10
| INFORMATION ELEMENT | TYPE | LENGTH |
|---|---|---|
| PROTOCOL DISCRIMINATOR | M | 2 |
| MESSAGE TYPE | M | 6 |
| R-TRANSACTION IDENTIFIER | M | 8 |
| R-DATA UNIT | M | 16-* |

| FIELD | SIZE |
|---|---|
| LENGTH INDICATOR (N) IN OCTETS | 8 |
| HIGHER LAYER PROTOCOL IDENTIFIER (HLPI) | 8 |
| HIGHER LAYER PROTOCOL DATA UNIT | 8 * (N-1) |

METHOD AND APPARATUS FOR OVER-THE-AIR PROGRAMMING OF TELECOMMUNICATION SERVICES

This is a Continuation of application Ser. No. 09/213,416 filed Dec. 17, 1998, now U.S. Pat. No. 6,456,843 which in turn is a Continuation of application Ser. No. 08/728,275, filed Oct. 8, 1996, now U.S. Pat. No. 6,122,503. The entire disclosure of the prior application(s) is hereby incorporated by reference herein in its entirety.

CROSS REFERENCE TO RELATED APPLICATIONS

The present application is related to U.S. patent application Ser. No. 08/728,275, filed on Oct. 8, 1996 and entitled A METHOD AND APPARATUS FOR OVER-THE-AIR PROGRAMMING OF TELECOMMUNICATION SERVICES.

BACKGROUND OF THE INVENTION

The present invention relates to over-the-air programming of telecommunication services. More particularly, the present invention provides dynamic updating of mobile station databases to provide flexible telecommunication services.

An industry standard referred to as IS-136 defines a standard for mobile stations which communicate in the cellular and PCS bands. The standard defines the basic functionality of the mobile station as well as the communication protocols between the mobile station and a mobile station switching center. One of the important aspects of a mobile station designed in accordance with this standard is the programmability of the station to be flexible in its operation.

The mobile stations employing this particular standard have been recognized as being useful for implementing a feature known as Intelligent Roaming (IR). This is a process that a mobile station or phone goes through to assure that it is receiving the best service possible regardless of the location that the phone is in.

The following description provides the background for understanding the significance of intelligent roaming in the mobile environment. This should be understood as providing merely an example of one particular telecommunication service which is available using an IS-136 mobile station.

FIG. 1 illustrates a portion of the radio frequency spectrum. Frequency range 10 centered around 800 MHz has historically been known as the cellular frequency range and frequency range 12 centered about 1900 MHz is a newer defined frequency range associated with Personal Communication Services (PCS). Each range of frequencies, i.e., the cellular and PCS are broken into two portions. In cellular frequency range 10, there is up-link portion 14 which is used for communications from a mobile communication device to a base station such as a cellular base station. Portion 16 of cellular frequency range 10 is used for down-link communications, that is, communications from a cellular base station to a mobile communication device. In a similar fashion, portion 18 of PCS frequency range 12 is used for up-link communications, that is, communications from a mobile communication device to a base station. Portion 20 of PCS frequency range 12 is used for down-link communications, i.e., communications from a base station to a mobile communication device.

Each of the frequency ranges is broken into bands which are typically associated with different service providers. In the case of cellular frequency range 10, frequency bands 30 and 32 are designated band "a" for up-link and down-link communications respectively. In a particular geographic area, a cellular service provider is assigned frequency band "a" to carry out mobile communications. Likewise, in the same geographic area another cellular service provider is assigned frequency bands 34 (up-link) and 36 (down-link) which are designated "b". The frequency spectra assigned to the service providers are separated so as to not interfere with each other's communications. This enables two separate service providers to provide cellular service in the same geographic area.

The U.S. government has auctioned the PCS frequency spectra to service providers. As with the cellular frequency range, the PCS frequency range is broken into several bands where a different service provider may use a particular frequency band for which it is licensed within a particular geographic area. The PCS bands are referred to as A, B, C, D, E, and F. The A band includes up-link band 50 and down-link band 52. The B band includes up-link band 54 and down-link band 56. Band C includes up-link band 58 and down-link band 60. Each up-link and down-link band of the A, B, and C bands are approximately 30 MHz wide. The D band includes up-link band 62 and down-link 64. The E band includes up-link band 66 and down-link band 68. Likewise, band F includes up-link band 70 and down-link band 72. The up-link and down-link bands of bands D, E and F are approximately 10 MHz wide each. It should be noted that with these cellular and PCS frequency bands it is possible to have as many as eight different wireless communication service providers in a particular area.

Each of the different cellular and PCS bands consist of control channels and communication channels in both the up-link and down-link direction. In the case of analog cellular bands there are twenty-one control channels for the "a" and "b" bands. Each of the control channels include an up-link and down-link portion. The control channels transmit information such as a System Operator Code (SOC), a System Identifier Code (SID), paging information, call set-up information and other overhead information. such as information relating to registering with the mobile communication system.

A portion of the cellular band's spectrum not occupied by the control channels is used for communication channels. Communication channels carry voice or data communications, where each channel consists of an up-link or down-link communications link. Presently, there are several cellular communication standards. An analog standard known as EIA/TIA553 was built upon the AMPS (Advanced Mobile Phone Service) standard. This standard supports twenty-one Analog Control Channels, (ACC) and several hundred Analog Voice or Traffic Channels (AVC). A newer standard is the EIA/TIA IS54B standard which supports dual mode operation. Dual mode operation refers to having an analog control channel, and either an analog/traffic channel or a Digital Traffic Channel (DTC). The AVC or DTC are used for actual communications, and the ACC is used to transfer information relating to, for example, call set-ups, service provider identification and the other overhead or system information. The EIA/TIA IS136 standard supports communications covered by both analog and dual mode cellular, and also includes a totally digital communication scheme which was designed for the PCS frequency bands A to F and cellular frequency bands "a" and "b". This standard allows for a digital traffic channel and a digital control channel (DCCH). In the case of the DTC, not only is the voice or data communicated, but in addition, a digital channel locator (DL) is transmitted to the DTC. The DL enables a mobile communication device that locks onto the DTC to use the information in the DL to locate a DCCH for purposes of obtaining information such as the SOC, SID, paging information and other system overhead information carried on the digital control channel.

When a mobile communication device such as a mobile telephone, attempts to register with the service provider, it locks onto a control channel and reads information such as the SOC and SID. If the SOC and/or SID correspond to a service provider with which the user has a communication services agreement, the telephone may register with the service provider's mobile communication system via the up-link control channel.

FIG. 2 illustrates a map of the United States illustrating cities such as Seattle, Chicago and Washington, D.C. For example, in Seattle frequency band A has been licensed to SOC 001 with a SID of 43 and band C has been licensed to SOC 003 with a SID of 37. In Chicago, suppose that frequency band C has been licensed to SOC 001 with a SID equal to 57, and that band B has been licensed to SOC 003 with a SID of 51. In Washington, DC suppose that frequency band "a" has been licensed to SOC 001 with a SID of 21, and that band A has been licensed to SOC 003 with a SID of 17. It should be noted that the same SOC may be found in several different locations although on different frequency bands. It should also be noted that the same SOC will be associated with different SIDs in each geographical area and that in the same geographic area different service providers have different SIDs. If a particular subscriber to a wireless communication service has an agreement with a service provider having a SOC of 001, that subscriber would prefer to use systems with a SOC of 001 because the subscriber is likely to receive a less expensive rate. When the subscriber is in Seattle, he or she would prefer to be on band A, and if in Chicago, on band C, and if in Washington, D.C., on band "a". The above described situation presents a problem for a wireless communication subscriber. As the subscriber moves from one area of the country to another, the telephone when turned on, searches for the "home" service provider or the service provider with which the subscriber has a prearranged agreement. If, for example, the subscriber travels from Seattle to Chicago, when turning the phone on in Chicago, the phone will search through the different bands of the spectrum to identify the service operator with the code 001 in order to find the desired service provider.

In a co-pending application assigned to the same assignee as the present invention, the inventors recognized that it was beneficial to take advantage of the database capabilities within the IS-136 mobile stations and store information to control the process by which a mobile station searches for a service channel when it is out of the its home region. This concept is referred to as Intelligent Roaming (IR). This concept is described in U.S. Ser. No. 08/570,905 entitled "A Method for Selecting a Wireless Communications Service Provider in a Multi-Service Provider Environment". Other applications directed to Intelligent Roaming include: U.S. Ser. Nos. 08/570,904; 08/570,903; and 08/570,902.

While the IR functionality provides improved teleservice for subscribers, it nonetheless does not take full advantage of the programmability of the mobile station and fails to address a problem that arises specifically with respect to intelligent roaming, namely the changes in agreements between service providers. In particular, it is common in the wireless communication area that relationships between service providers will change over time. These are contractual arrangements which determine how subscribers of related services will be treated as they roam from one region to the next. It may so happen that over time two service providers can have a favorable relationship that subsequently changes to an unfavorable relationship. Under those circumstances, if the mobile station has been pre-programmed with information for intelligent roaming then it may wrongly identify a favored partner/associate service provider as the customer roams through various geographic areas. It is therefore desirable to provide a method to make the intelligence of the mobile stations available to adapt the station to such changes in provider capabilities and relationships.

SUMMARY OF THE INVENTION

The present invention provides a method for enabling a service provider to provide telecommunication service updates to mobile stations without active involvement of the subscribers of those stations. More specifically, the present invention provides that a database within the service provider's network can be updated in accordance with changes in telecommunication services (such as changes in agreements with other service providers). This database can then automatically be sent to the mobile stations to update the database information within the mobile stations. This updated information, which is used to control the operations of the mobile station, such as to control the roaming operation of the station as it is moved throughout various geographic areas, is provided over the air by the provider without specific activities by the subscriber.

In accordance with an embodiment of the present invention, service information is updated in a central database. A plurality of mobile stations having service information storage capabilities are identified and then a subset of this plurality of mobile stations is selected to be updated. The method then detects whether a selected mobile station is activated. If the selected mobile station is activated then updated service information is transferred from the central database to the selected mobile station. If the selected mobile station is not activated then the selected mobile station is designated to be updated when it is later activated.

The service information may include data for managing intelligent roaming operations. In addition, the step of identifying the plurality of mobile stations having service information storage capabilities may occur automatically upon completion of updating of the central database.

In an embodiment of the method more specifically directed to intelligent roaming, an intelligent roaming database is updated. Subsequently, wireless telephones having over-the-air programmability are identified. Then, an update status indicator for wireless telephone having this programmability is set. Then, in accordance with the method it is detected whether wireless telephone has its update status indicator set is activated. If such a wireless telephone is detected to be activated then the intelligent roaming information in the updated database is transferred to the wireless telephone. If the wireless telephone is detected to not be activated then the wireless telephone is designated to receive the updated intelligent roaming database when the wireless telephone is later activated.

The present invention thus provides over-the-air programming of the mobile station as it relates to teleservices associated with that station.

BRIEF DESCRIPTION OF THE DRAWINGS

FIG. 3 illustrates in block diagram form an embodiment of the present invention.

FIG. 4 illustrates an example of a telecommunication service database containing information to be transferred to a mobile station.

FIG. 5 illustrates a tabular presentation of information involved in a message transfer from an over-the-air processor in FIG. 3 to a message switching center.

FIG. 6 illustrates a tabular presentation of a message format in accordance with the protocol for defining communications between the over-the-air processor and the message switching center.

FIG. 7 illustrates an example of the format of an over-the-air programming teleservice message used in the communication between the over-the-air processor and mobile switching station of FIG. 3.

FIG. 8 illustrates the allotment of communications channels which can be used to transmit the teleservice information over-the-air from the mobile switching center of FIG. 3 to the mobile station itself.

FIG. 9 illustrates the format of a message transmitted by the mobile switching station to the mobile station to effect a transmission of teleservice information.

FIGS. 10 and 11 further define the format of the message transmitted to the mobile station.

FIGS. 12 and 13 show the message flow in connection with an attempt to update a mobile station.

DETAILED DESCRIPTION

Figure 1:
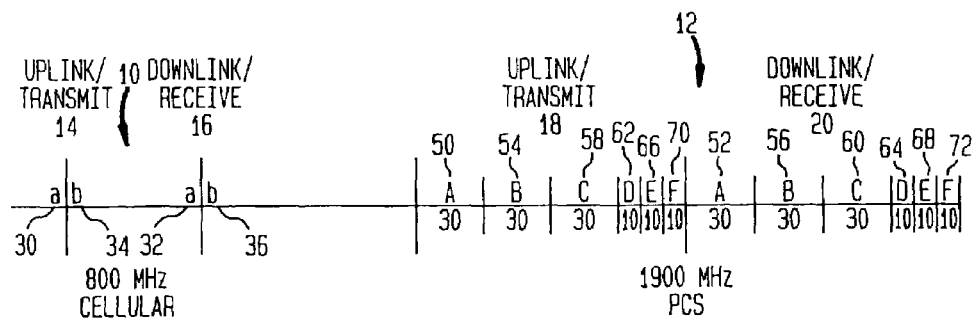
FIG. 1 is a description of frequency allocations for cellular and PCS communications.
Figure 2:
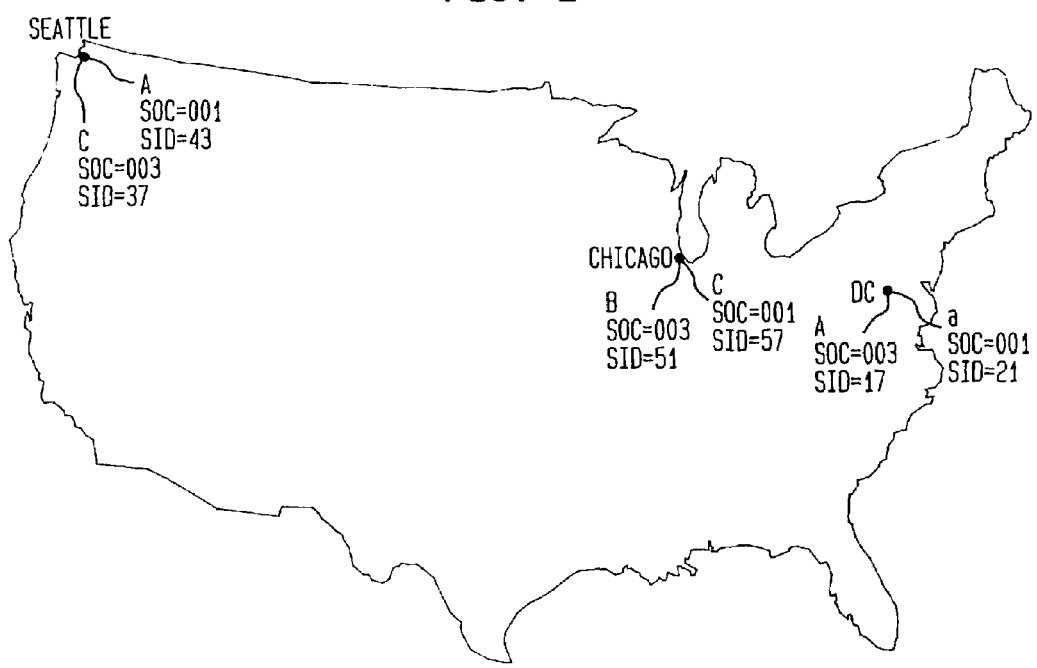
FIG. 2 illustrates an example of the assignment of cellular and PCS frequencies to two different system operators in three different geographic locations.

In accordance with the present invention, an architecture is provided for providing over-the-air programming to the mobile station. In the embodiment which is described in further detail, the over-the-air programming relates to intelligent roaming information. However, it should be recognized that this is merely an example of the type of information which could be transmitted by the service provider to the subscriber that has such a programmable instrument as the need may arise.

FIG. 3 illustrates an embodiment of an architecture which will effect the appropriate over-the-air programming of the subscriber's mobile station.

Mobile station 30 complies with the IS-136 protocol requirements. This mobile station 30 communicates over-the-air with mobile switching station 31. A customer service center 310 generates appropriate information regarding relationships between system operators so as to define favorable and unfavorable system operator selections. This service center communicates this system operator relationship information to the message center (MC) 311. A distinct portion of that message center is treated as an over-the-air processor (OTAP) 312. That OTAP includes an intelligent roaming database (IRDB) 313. As is typical in a mobile environment, a home location register/authentication center (HLR/AC) 314 is coupled to the messaging center via a communications line that satisfies the IS-41 protocol. The visitor location register (VLR) 315 contains information which identifies the location of the subscriber in a visiting geographic region. The VLR 315 communicates with the HLR in an IS-41 protocol and also communicates with the mobile switching center 31 with the same protocol. Finally, the protocol that governs the communications between the OTAP 312 and MSC 31 is also IS-41.

In summary, an external terminal, via the customer service center (CSC) 310, updates information regarding agreements between system operators. This information is subsequently supplied to the IRDB 313. After the update of the central database is completed, an update of the content of the memory within each of the programmable mobile stations can be initiated either manually or automatically. After the initiation of the update process, the HLR 314 identifies the subscribers that have programmable mobile stations that can receive updated IRDB information. Upon identification of these mobile stations, the HLR 314 signals the OTAP 312 to create a message for transmission to the identified mobile station in which the updated contents of the IRDB 313 are transferred from the OTAP 312 to the mobile station 30. The transfer occurs via the mobile switching center (MSC) 31. If, after the HLR 314 has indicated that an update should be performed, the MSC 31 indicates that the identified mobile station is inactive, then the OTAP 312 will indicate that fact to the HLR 314 which in turn will set a delivery pending indicator (DPI) in the HLR 314 with respect to that mobile station. At a later time when that mobile station is activated and registers, the HLR 314 will again prompt the OTAP 312 to create the appropriate message including the update of the IRDB 313 which will then be sent via the MSC 31 to the mobile station.

The above description provides a general description of the operations performed by the elements within the embodiment of the present invention. The following subsections will describe in greater detail the necessary functions for the HLR, OTAP and MSC as well as the communications between these elements and between the MSC and the mobile station.

HLR Requirements to Support Over-the-Air Programming

Certain functional requirements are necessary for an HLR to support the over-the-air program capability.

First, the HLR subscriber records should support more than one delivery pending flag, (DPF) to support a number of teleservices. That is, the HLR will support an indication that messages must be transmitted to the end user such as the over-the-air programming (OAP)described above or the CMT (Cellular Messaging Teleservice). The HLR also supports the ability to specify different message centers (MCs) for these CMT and OAP messages. This implies that each delivery pending flag in the HLR will specify a different message center address.

The HLR shall have the capability to set the OAP DPF for a particular Electronic Serial Number (ESN)/Mobile Identification Number (MIN), or a range of MINs for the maintenance terminal. If a range of MINs is selected, the HLR shall set the OAP DPF only for phones that are IS-136 Rev. A or above. The range of MINs is specified as a block (that is NPA-Nxx-xxxx to MPA-Nyy-yyyy).

The HLR shall also prioritize the delivery of teleservice messages. Short message service SMS cellular messaging teleservice, SMS cellular paging teleservice messages and over-the-air activation teleservice messages shall have priority over OAP teleservices messages. If an SMS delivery pending flag and an OAP delivery pending flag are both set for a mobile station then the SMS message delivery shall take priority over OAP.

The HLR must be capable of receiving SMS request messages from the OTAP in the message center. The HLR shall then inspect the SMS request parameters including the SMS teleservice identifier for OAP. The HLR shall also check the MS status as either active or inactive. If the MS is active, then the HLR provides the servicing MSC point code as is done for the SMS cellular messaging teleservice (CMT). If the MS is inactive then the HLR sets a new flag defined in the subscriber profile to indicate that an OAP message is waiting to be delivered to the MS. This is an OAP message delivery pending flag. There shall be a OAP delivery pending flag for each ESM/MIN record that is IS-136 capable in the HLR.

The OAP delivery pending flag is cleared when the OAP message is successfully delivered.

The Functional Requirements of the Over-the-Air Activation Processor (OTAP)

In accordance with an embodiment of the present invention the OTAP is associated with the message center MC. The following functional requirements must be supported by the OTAP so as to support over-the-air programming. The OTAP application shall be a separate application from the Message Center. The intent is to allow the OTAP application to exist on the message center platform without the need for the SMS cellular message teleservice application to exist simultaneously on the platform.

The OATP shall store the latest intelligent roaming database. The IRDB, which may contain information from all of the mobile stations (or only some number of the stations where multiple IRDBs are employed), shall be stored in memory that is not cleared during any level of initialization or processor restart. Periodic maintenance of the OTAP shall confirm the validity of the IRDB data. Additionally, a backup mechanism should exist for storing the IRDB and the mechanism should be provided to reload the database in the event of hardware failures.

The OTAP shall provide a mechanism for entry of the IRDB into the OTAP via a maintenance terminal, and also for providing changes to individual fields in the database as required.

The OTAP shall receive a SMS notification from the HLR that instructs the OTAP to deliver an IRDB to the mobile indicated in the request using the IS-41 protocol. The OTAP shall return an SMS notification to the HLR in response to this request and then will construct messages compatible with both the IS41 protocol as well as the IS 136 protocol. The OTAP shall then provide a method for assigning a unique transaction identifier to the OPTS message before it is sent to the mobile station. This identifier is used to identify acknowledgments from the mobile station or the network. The OTAP shall support OPTS message delivery using the IS-41 Revision C SMS Delivery Point-to-Point with the appropriate SMS Teleservice Identifier. The IRDB shall be mapped into the SMS BearerData. If the mobile station is determined not to be accessible when a download is attempted, then the OTAP will request the HLR to set the over-the-air programming delivery pending flag (OAP DPF).

Signaling Between the HLR and OTAP

A primary interest in the implementation of the present invention is the initiation of the updating operation. The HLR receives either a manual command or an automatic command after completion of updating of the central IRDB database to initiate updating of the mobile stations. The HLR, under software control selects a predetermined number of mobile stations based on a criteria such as the MIN. The HLR then detects which of the set of mobile stations within the MIN range defined has the IS-136 programmability feature. As the HLR steps through the MIN list of identified mobile stations it transfers a SMS request signal in IS-41 protocol to the OTAP requesting that an updated IRDB be transmitted to the identified mobile station.

MSC Requirements for Over-the-Air Programming

To support the implementation of the present invention the message switching center shall be capable of supporting SMS Delivery Point-to-Point (SMS DPP) messages from the OTAP application in the message center. The MSC also encapsulates an SMS BearerData-from the SMDPP message onto an IS-136 R-Data message. This process is identical to the delivery of an SMS cellular messaging teleservice (CMT) message to a mobile station. Additionally, the MSC shall transparently pass an IS 41 SMDPP message to an IS-136A R-data message for SMS Teleservice Identifiers in a prescribed range. This will enable the OTAP to specifically identify the teleservice of interest and more specifically in the present environment to identify the updating of the intelligent roaming database as the functionality of the transmission of the short message.

The remainder of the specification will describe details of the signaling that performs the updating operation and the message flow which is a consequence of that signaling.

Signaling Between the OTAP and MSC

As described above, the OTAP includes the IRDB. An example of the contents of this database are illustrated in FIG. 4. The IR control data specifies specific data used to control the intelligent roaming function. The band order defines the cellular and PCS band search order. The number of partners/favored/forbidden SOCs or SIDs defines the number of system operator codes or system identifiers contained in the list. The total number of SOCs and SIDs is limited by the underlying transport layers. Partner/favored/forbidden SIDs list includes a list of the partners/favored/forbidden SIDs. These SIDs are fifteen bits in length according to the IS-136 standard. Similarly, the partner/favored/forbidden SOC list identifies the list of partners/favored/forbidden SOCs where the SOCs are 12 bits in length as identified by the IS-136 standard. The information regarding "number cellular" identifies the number of probability blocks to search while scanning in a cellular band. The Number PCS block identifies the number of sub-bands to search when scanning in a PCS band. The re-scanned count specifies the time to wait before doing a partial scan of the last band used between history searches. Finally, the re-scanned loop specifies how many triggered partial scans before going to a wide-band scanned.

The entire IRDB is downloaded to a mobile station via over-the-air programming. As initially considered, modification to the table occurs then the entire IRDB is downloaded to the mobile.

The construction of the signalling must take into account that under the IS 41 standard there is a limitation on the size of messages that can be sent in a single short message delivery point-to-point (SMDPP message). Thus, the SMS BearerData associated with the definition of the IRDB update to the mobile station is somewhat limited, thereby limiting the number of SOCs or SIDs which can be provided in the IRDB.

As indicated the OAP teleservice messages are delivered from the OTAP to a short message entity (SME) in the mobile station first by providing signalling to the MSC in an IS-41 protocol. The appropriate protocol is a SMS delivery point-to-point operation. The format of the parameters for such an operation are illustrated in the table of FIG. 5. It is the SMS BearerData that contains the OPTS message. The format for the SMS BearerData is shown in the table of FIG. 6. The contents field portion of this BearerData contains the OPTS message and is formatted as shown in FIG. 7. The SMS Teleservice Identifier, FIG. 5, indicates the teleservice for which the SMS message applies. This identifier is used by the MSC to map to the BearerData to the IS-136 R-data message. In accordance with the present invention, the selected teleservice identifier is among those reserved for carrier specific teleservices. The MSC will then transparently pass the message to the R data using a known method.

The IS-136 Over-the-Air Interface

The over-the-air programming delivers information to the mobile station over the error interface using the IS-136 R-data message over a SMS point-to-point, paging and access response (SPACH) logical channel of the Digital Control Channel (DCCH). The IS-136 also defines delivery of R-data messages over the associated control channel of a digital traffic channel.

FIG. 8 illustrates a DCCH channel structure. Upon power-up an MS enters the control channel scanning and locking state when it is in the process of selecting a candidate service provider. Using the IS-136 DCCH scanning and locking control channel selection procedures, the MS selects a candidate (DCCH) and enters the DCCH camping state. The mobile station shall receive the over-the-air programming messages while in the DCCH camping state via a SPACH notification of R data.

Delivery of the OAP information is a teleservice similar to the short message service cellular messaging teleservice (SMS CMT). The over-the-air programming messages are differentiated from other teleservices by a higher layer protocol identifier. The OPTS builds upon R-data and all messages are contained within the R-data unit. FIG. 9 illustrates a format of an OPTS message carried in R-data. The R-data is a relay message that is used to carry point-to-point teleservice layer messages. The format of the R-data message is illustrated in FIG. 10. The protocol discriminator identifies the protocol for the message being sent while the message-type information identifies the function of the messages such as for teleservices.

Figures 11, 12:
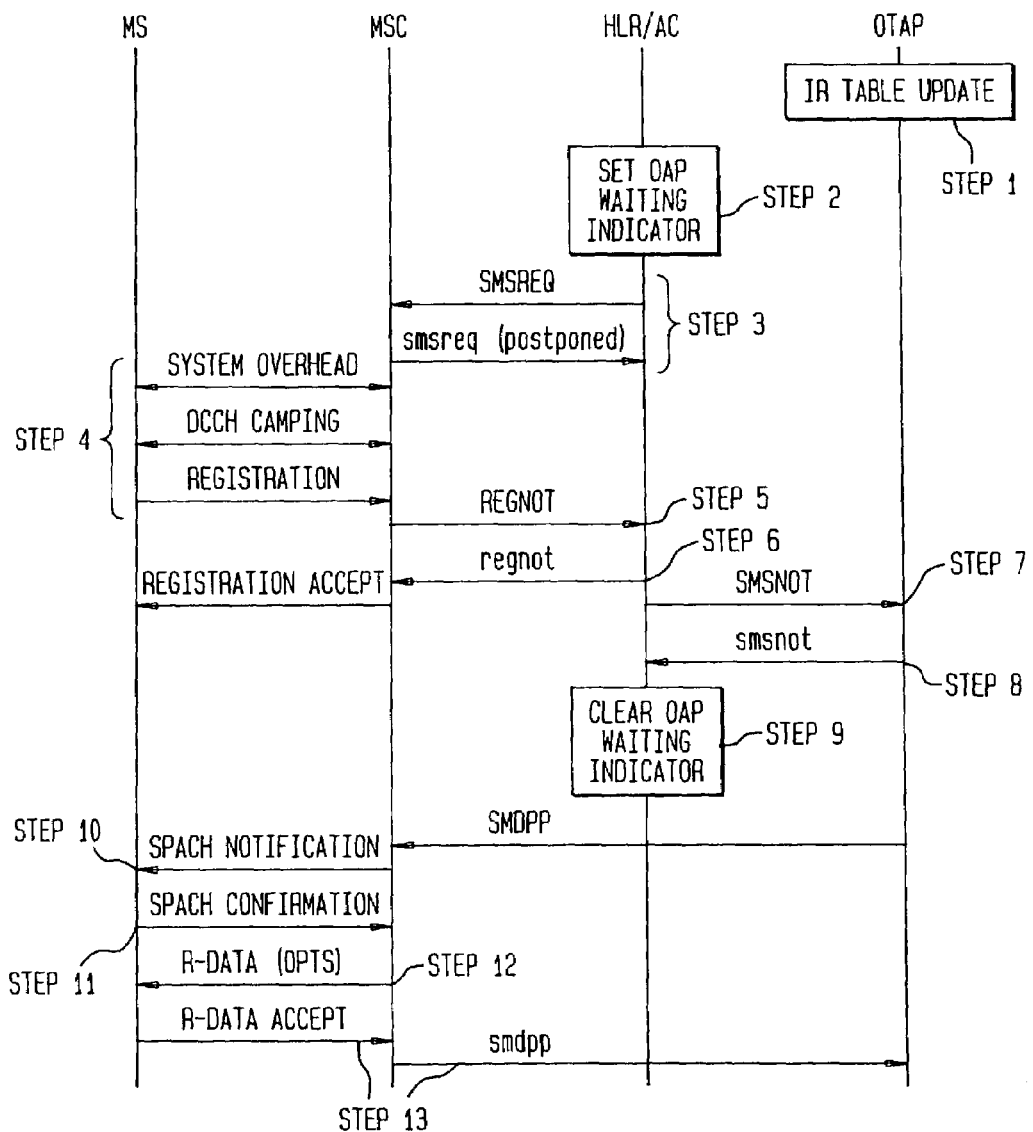

An R-data unit format is illustrated in FIG. 11. The higher layer protocol data unit referred to in FIG. 11 contains the OPTS message.

Upon receipt of an R-data message with OPTS the mobile station will acknowledge receipt of the OPTS message with an IS 136 R-data accept or R-data reject message on the random access channel (RACH). This channel is a reverse logical channel in the DCCH. The mobile station sends an R-data accept if the message is received and accepted. Otherwise, an R-data reject message is sent.

Message Flows

Figure 13:
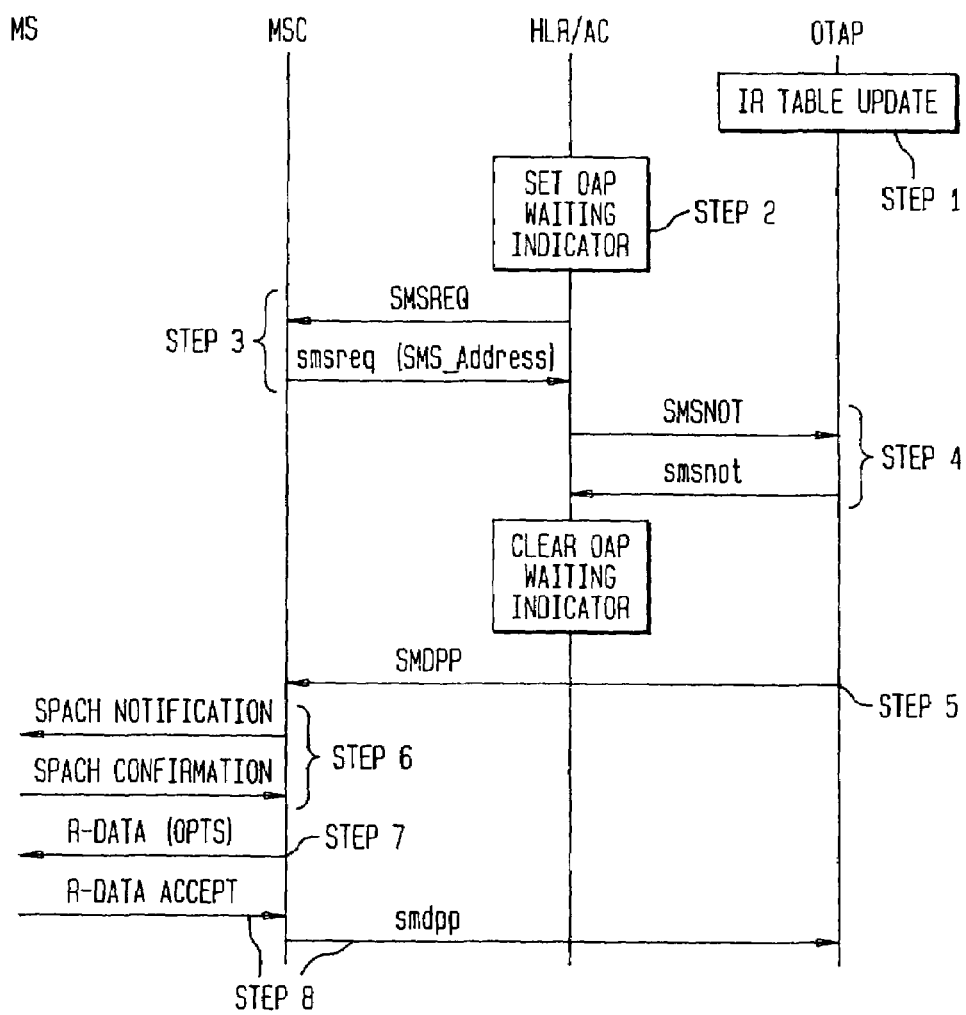

FIGS. 12 and 13 illustrate examples of message flows where IRDB updates are requested by the HLR and the immobile station is either inactive (FIG. 12) or active (FIG. 13). In these figures the communicating network elements are shown at the top of the chart. The steps take place in accordance with the passage of time as delineated by the vertical axis.

OAP to an Inactive MS

In step 1 an inter-carrier services group supplies IR table updates. OTAP operations personnel enter the updates into the OTAP. Through a manual process, the operator in each HLR is instructed to initiate the OAP process. It is envisioned that in the future such an instruction could be automated rather than part of a manual process. In step 2, a list of ESN/MINs is defined for which the OAP process is to be performed. At the HLR a command is issued on the maintenance terminal to set the OAP message waiting indicator for all IS-136 mobiles specified in the list. The remaining steps are then repeated for each ESN/MIN that has an OAP message waiting indicator set.

Optionally, the HLR identifies the destination point code of the MSC for the last registration of the IR-capable phone and sends an SMSREQ to the MSC. The mobile switching center cannot locate the IR-capable phone and returns a SMSREQ to the HLR with a postponed indication (step 3).

At some point the IR-capable phone receives the system overhead, camps on a DCCH, and sends a registration (step 4). When the MSC receives the registration it sends an IS-41 registration notice (REGNOT) to the HLR (step 5). When the HLR receives this signal it registers the IR capable phone and sends a response back to the MSC which in turn, sends a registration accept to the IR capable phone (step 6). The HLR then identifies that the IR capable phone has an OAP message waiting and sends an SMSNOT to the OTAP (step 7). The OTAP identifies that the mobile station is awaiting an IR update and formats a message into an IS-41 SMDPP and sends it to a MSC using the address supplied by the HLR (step 8). The OTAP responds to the HLR and the HLR clears the OAP message waiting indicator for the ESN/MIN (step 9).

When the MSC receives the SMDPP it attempts to locate the mobile station by sending an IS-136 SPACH notification message indicating R-data (step 10). The mobile station responds to the notification and enters the terminating point-to-point teleservice proceedings state (step 11). The MSC then packages the appropriate data into an R-data message and sends it to the IR capable phone on the SPACH (step 12). The phone receives the R-data, identifies the message as being an IR table update and proceeds to update its internal IR database. It then sends an R-data accept back to the MSC which in turn sends a response to the OTAP indicating that the information has been received (step 13).

In FIG. 13, the mobile station is already active rather than inactive. The initial part of the process is very similar to that just described. In particular, the inter-carrier services group supplies the IR table updates and those updates are entered into the OTAP (step 1). Again, a list of ESN/MINs is defined for which the process is to be performed and a command is issued to set the OAP message waiting indicator for all IS-136 mobile stations within such a list (step 2). The HLR then begins to process the OAP messaging waiting indicators by sequencing through each ESN/MIN. Optionally, the HLR identifies the destination point code of the MSC for the last registration of the IR-capable phone and sends a request to the SMC to the MSC. The MSC then locates the IR capable phone and returns information to the HLR within an SMS address (step 3). The HLR in turn sends a notification to the OTAP to perform the update (step 4). The OTAP then identifies that the "message waiting" is an IR update and formats the message into an IS-41SMDPP and sends it to the MSC using the addressing supplied by the HLR (step 5). The OTAP responds to the HLR to identify that it has received the request. The HLR then clears the OAP message waiting indicator for that ESN/MIN. The MSC receives the SMDPP and attempts to locate the mobile station by sending an IS-316 SPACH notification message indicating R data. The MS responds to the notification message with a confirmation signal and enters the terminating point-to-point teleservice proceeding state (step 6). The MSC then packages the data into an R-data message and sends it to the IR capable phone on the SPACH (step 7). The IR-capable phone receives the R data, identifies the message as being an IR table update and proceeds to update the IR database. The IR-capable phone sends an R data accept back to the MSC. That MSC then sends a response to the OTAP (step 8).

Conclusion

The above detailed description sets forth an embodiment by which over-the-air programming can be performed from a database in a messaging center to a programmable mobile station. The messaging center works together with the HLR to determine those mobile stations which are programmable and the order in which over-the-air programming should occur with respect to those mobile stations. In the above example the programming relates to updating the intelligent roaming database. This is a significant application because the relationships between system operators is very fluid and changes over time. This information should be transmitted to the subscribers who have the capability of implementing intelligent roaming so that they are appropriately effecting the roaming in accordance with the most up-to-date information regarding the relationship between the subscriber's service provider and other service providers.

The description of the present invention has focused on the transmission technique which relies on short message service type messaging to transfer information from the message center to the mobile station. It is respectfully submitted that such a technique can be used to implement other teleservices where data needs to be transferred from the service provider to the programmable mobile station.

What is claimed is:

1. A method for updating service information stored in a mobile station from information stored in a central database, the method comprising the steps of:
   identifying a plurality of mobile stations having service information storage capabilities and selecting some subset of said plurality of mobile stations to be updated;
   detecting whether a selected mobile station is activated;
   setting a delivery pending indicator associated with ones of said subset of said plurality of mobile stations to be updated that is not activated;
   if said selected mobile station is activated then transferring updated service information from said central database to the selected mobile station via a data message within a data communications channel, and
   if said selected mobile station is not activated then designating said selected mobile station to be updated when it is later activated.

2. The method of claim 1 wherein said service information includes data for managing intelligent roaming operations.

3. The method of claim 1 further comprising a step of updating service information in the central database comprising the step of modifying a service information database within said central database and said central database is included in a network message center.

4. The method of claim 3 wherein said step of identifying is automatically triggered by completion of said step of updating.

5. A system for updating service information stored in mobile stations, the system comprising:
   a first database storing subscriber information;
   a second database storing service information;
   an update terminal associated with said second database and providing updated service information to said second database;
   a processor, responsive to an update of said service information, that sets an update status indicator for a set of subscribers identified by said first database as having mobile stations capable of updating;
   said processor further being programmed to:
      detect whether a given mobile station having a set update status indicator is activated;
      set a delivery pending indicator associated with a given mobile station that is not activated; and
      command a transfer of updated service information from said second database to a given mobile station that is activated via a data message within a data communications channel.

6. The system of claim 5 further comprising a message center in which said second database resides.

7. The system of claim 5 wherein said first database is constituted by a home location register.

8. A method for updating intelligent roaming information for a mobile communication device, the method comprising:
   identifying mobile communication devices capable of over-the-air programming;
   if an identified mobile communication device is activated, then over-the-air programming intelligent roaming information into the mobile communications device via a data message within a data communications channel;
   if an identified mobile communication device is not activated, then
   designating the identified mobile communication device to be over-the-air programmed with intelligent roaming information via the data message within the data communications channel when the identified mobile communication device is later activated.

9. The method of claim 8, further comprising setting an update status indicator for mobile communication devices identified as capable of over-the-air programming.

10. The method of claim 8, further comprising detecting whether an identified mobile communication device is activated.

11. The method of claim 8, wherein the device complies with IS-136 protocol requirements.

12. The method of claim 8, wherein the device is a cellular telephone.

13. The method of claim 8, wherein the intelligent roaming information is a prioritized list of favored and/or disfavored system identifier code information.

14. The method of claim 13, wherein the system identifier code information includes a SOC.

15. The method of claim 13, wherein the system identifier code information includes a SID.

16. The method of claim 8, wherein the intelligent roaming information is current information that has been updated to reflect a current prioritized list of favored and/or disfavored system identifier code information.

17. The method of claim 8, wherein the mobile communication device registers with communication service providers according to the intelligent roaming information.

18. An element in a telecommunications network for providing communication services from a service provider to a mobile communication device in a multiple service provider environment, comprising:
   an over-the-air processor that receives information in a data message communicated via a data communications channel regarding relationships among system providers; and
   a database communicating with the over-the-air processor, containing intelligent roaming information for transmitting to the mobile communications device and a delivery pending indicator associated with a mobile communications device that is not activated.

19. The element of claim 18, wherein the database includes an update status indicator for identifying mobile communication devices capable of over-the-air programming.

20. The element of claim 18, wherein the intelligent roaming information is information used to control a process by which the device searches for a service provider.

21. The element of claim 18, wherein the intelligent roaming information is a prioritized list of favored and/or disfavored system identifier code information.

22. The element of claim 18, wherein the intelligent roaming information is current information that has been updated to reflect a current prioritized list of favored and/or disfavored system identifier code information.

23. A home location register in a telecommunications network for providing communication services from a service provider to a plurality of mobile communication devices, comprising:

a database of identifiers corresponding to predetermined ones of the plurality of mobile communication devices;

a controller for instructing the network to transmit intelligent roaming information to the predetermined ones of the plurality of mobile communication devices via a data message communicated in a data communications channel;

a receiver for receiving an indication of which predetermined ones of the plurality of mobile communication devices are activated; and a delivery pending indicator associated with each of the predetermined ones of the plurality of mobile communication devices that is not activated.

24. The home location register of claim 23, wherein when one of the plurality of mobile communication devices is subsequently activated, the controller instructs the network to transmit intelligent roaming information to the one of the plurality of mobile communication devices, and the delivery pending indicator is cleared for the one of the plurality of mobile communication devices.

25. The home location register of claim 23, wherein the home locator register communicates with a plurality of message centers, and the delivery pending indicator specifies an address of one of the plurality of message centers.

26. The home location register of claim 23, wherein the delivery pending indicator includes a first delivery pending flag for indicating delivery of intelligent roaming information, and a second delivery pending flag for indicating delivery of cellular messages.

27. The home location register of claim 26, wherein the second delivery pending flag is prioritized over the first delivery pending flag.

28. A method of providing updated intelligent roaming information to a mobile communication device, comprising:

updating an intelligent roaming database in a network;

sending a message from a home location register to the network to instruct the network to transmit the updated intelligent roaming database to the mobile communication device wherein the message is communicated via a data communications channel;

detecting whether the mobile communication device is active; and setting a delivery pending indicator if the mobile communication device is not activated to indicate that the updated intelligent roaming database should be subsequently transmitted to the mobile communication device when the mobile communication device is later activated.

29. The method of claim 28, wherein the network includes an over-the-air processor.

30. The method of claim 29, wherein the over-the-air processor is associated with a message center that communicates with but is separate from the home location register.

31. The method of claim 28, wherein the home location register determines whether the mobile communication device is capable of receiving the updated intelligent roaming database before sending the message to the network.

* * * * *